United States Patent [19]

Argabright et al.

[11] 4,397,748

[45] Aug. 9, 1983

[54] TREATMENT OF SANITARY SEWER SYSTEMS

[75] Inventors: Perry A. Argabright, Larkspur; John S. Rhudy, Littleton, both of Colo.

[73] Assignee: Marathon Oil Company, Findlay, Ohio

[21] Appl. No.: 320,447

[22] Filed: Nov. 12, 1981

[51] Int. Cl.³ .............................. C02F 1/54; F17D 1/17
[52] U.S. Cl. .................................. 210/733; 210/734; 137/13; 252/8.55 R
[58] Field of Search .................. 137/13; 210/733, 734, 210/727, 728; 252/8.55 R

[56] References Cited

U.S. PATENT DOCUMENTS

| | | | |
|---|---|---|---|
| 3,480,761 | 11/1969 | Kolodny et al. | 210/734 |
| 3,542,044 | 11/1970 | Hansen et al. | 252/8.55 R |
| 3,841,402 | 10/1974 | Knight et al. | 252/8.55 R |
| 3,968,093 | 7/1976 | Hasegawa et al. | 210/734 |
| 4,236,545 | 12/1980 | Knight et al. | 252/8.55 R |

OTHER PUBLICATIONS

Billmeyer Jr., F. W.; "Textbook of Polymer Science", 2nd Ed.; Wiley–Interscience, (1971), pp. 90–96.

*Primary Examiner*—Benoit Castel
*Attorney, Agent, or Firm*—Jack L. Hummel

[57] ABSTRACT

A method of reducing the fluid flow friction loss of fluid waste materials in the conduits of sanitary sewer systems while at the same time maintaining the solid materials in the fluid in a flowable condition by introducing into a sewer system about 1 to about 10,000 ppm of an aqueous solution of a partially hydrolyzed polyacrylamide polymer having a preselected average molecular weight and molecular weight distribution.

9 Claims, No Drawings

TREATMENT OF SANITARY SEWER SYSTEMS

TECHNICAL FIELD

This invention relates to the treatment of fluids in the conduits of sanitary sewer systems to enhance the flow of the fluids through the conduits and, among other things, to prevent the accumulation on the walls of the conduits of solid waste materials normally present in such fluids.

BACKGROUND OF THE INVENTION

Depending upon the location of the sewage treatment plant, municipalities rely upon gravity, or mechanical means such as pumps, or both, to move fluid waste materials through a sanitary sewer system. The pumps used to move the waste materials may range in size from 10 horsepower to 500 horsepower, and pressures of upwards of 100 psig, or more, may be required to maintain flow in the conduits comprising the system. Due to the nature of fluid waste materials, they manifest a high fluid flow friction loss, or drag, during transport in a sewer system. This problem can become acute when the system is overloaded during periods of heavy use, or when the conduits of the system are too small to handle the volume of fluid waste material entering the system, a condition that oftentimes occurs when a community experiences a substantial growth in population and reaches a point where the original sewer system is no longer adequate to handle the increased demands placed upon it. In order to compensate for the drag which characterizes fluid waste materials, pumping requirements, and, therefore, the cost of moving the materials through the conduits of a sewer system, are correspondingly greater.

It is known that high molecular weight polymers are useful as drag reducing agents in the transportation of fluids through conduits. Thus, for example, in U.S. Pat. No. 4,236,545, radiation polymerized monomers such as acrylamide, methacrylamide, acrylic acid, methacrylic acid, and alkali metal salts thereof, and copolymers of said monomers, are disclosed as being useful as drag reducing agents when incorporated into fluids, especially fluids comprising water and a hydrocarbon. The patent cites a number of other U.S. patents directed to various polymers useful, for example, as drag reducing agents in drilling operations and the transport of oil through pipelines. One of those cited patents, namely, U.S. Pat. No. 3,542,044, discloses the use of an aqueous solution of a partially hydrolyzed polyacrylamide in an oil pipeline for reducing energy loss.

SUMMARY OF THE INVENTION

The present invention is directed to a method of treating sewer systems with a polymer, in particular, partially hydrolyzed polyacrylamide, to both reduce the fluid flow friction loss, or drag, which characterizes the transport of fluid waste materials in the conduits of such systems, and to serve as an effective flocculating agent for maintaining the solid particles present in the fluid in a mobile state and to prevent the accumulation of such particles on the walls of the conduits, a condition which increases the drag of the fluids. An important aspect of the present invention is centered on the ability to provide a partially hydrolyzed polyacrylamide, for example, which is capable of meeting the demands, from the standpoint of optimum drag reduction and flocculation of solids, of fluid waste materials in a sewer system under substantially any operating conditions. More specifically in this connection, drag reduction of fluid waste materials in the conduits of sewer systems is observed to increase with an increase in the average molecular weight, and a narrowing of the molecular weight distribution of the polymer added to the system. Thus, by selecting a polymer of the proper average molecular weight and molecular weight distribution, it is possible by the method of this invention to attain optimum drag reduction of fluid waste materials in a sewer system. Further, in this same connection, an added important advantage of the polymers used in the practice of the present invention is their greater resistance to shear degradation under turbulent conditions, a property which appreciably enhances the drag reduction capabilities of the polymers. It is noteworthy that the ability of the polymer to function as a flocculating agent is essentially unaffected in polymers having different average molecular weights and molecular weight distributions. The unique feature of being able to employ a polymer which is customized or tailer-made to achieve optimum drag reduction, while at the same time maintaining the solid particles comprising the fluid waste materials in an easily flowable condition, has significant economic advantages in that smaller size pumps can be used in a system, and, in communities which have outgrown an existing sewer system, the costly necessity for digging up the now too small conduits comprising the system, and replacing them with larger conduits, can be postponed, in many cases, indefinitely.

DETAILED DESCRIPTION OF INVENTION

The polymers having utility in the practice of the method of this invention advantageously are prepared from a water soluble monomer containing at least one vinyl grouping wherein the vinyl group is an acrylyl vinyl, a vinyl cyanide, a styryl vinyl, or a water soluble salt thereof. When the vinyl grouping is an acrylyl vinyl, the monomer may be represented by the formula:

$$CH_2=CY-CO-X$$

wherein X is hydrogen, an amino group ($NH_2$), hydroxy, methyl or an OR group, wherein R is a lower alkyl radical, and wherein Y is hydrogen or a methyl group. Exemplary of monomers having utility in the practice of the invention are acrylamide, acrylic acid, acrylonitrile, methacrylic acid, methacrylamide, methacrylonitrile, methyl methacrylate and sodium styrenesulfonate. Of this group, acrylamide is the preferred monomer. The acrylamide can be any of various commercially available polymerization grade acrylamides sold in solid form, or in the form of aqueous solutions. From the standpoint of safety considerations, the aqueous solutions are preferred because they eliminate the dust problems which characterize the solid form of the monomer.

The polymerization of the monomer is carried out in the presence of a suitable vinyl polymerization initiator or catalyst. Especially useful are free radical forming compounds such as the azo compounds exemplified by azobisisobutyranitrile and azobisisobutyamidine chloride; peroxides such as hydrogen peroxide, sodium peroxide and benzoyl peroxide; alkyl and dialkyl peroxides such as, for example, t-butyl hydrogen peroxides and diethyl peroxide; alkali metal, including ammonium, persulfates such as sodium persulfate, potassium persulfate and ammonium persulfate; and alkali metal bisulfites exemplified by sodium bisulfite and potassium bisulfite. Where the monomer to be polymerized is acrylamide, ammonium persulfate and sodium bisulfite, especially co-mixtures thereof employed in a ratio of about 9:1 to about 1:9, are preferred as the catalysts or free radical initiators. The rate of polymerization of acrylamide monomer using a co-mixture of ammonium persulfate and sodium bisulfite can be accelerated by replacing a portion of the sodium bisulfite with a ferrous compound such as ferrous ammonium sulfate. Excellent results are obtained in a tricatalyst system of this type where from about 20 to about 40, preferably about 30 to about 35, mole percent of the sodium bisulfite is replaced by the ferrous compound. As shall be discussed in greater detail below, the concentration of the free radical initiator or catalyst used in the polymerization step plays an important role in providing an aqueous polymer solution capable of achieving optimum drag reduction in a sewer system.

In accordance with one aspect of the invention, the drag reduction capabilities of the acrylamide polymers have been enhanced by carrying out the polymerization in the presence of certain organic polycarboxylic acids exemplified by ethylenediaminetetraacetic acid, N-(2 hydroxyethyl)-ethylene-diaminetetraacetic acid, and nitrilotriacetic acid. Thus, by way of illustration, in the polymerization of acrylamide, the addition of from about 250 to about 350 ppm of ethylenediaminetetraacetic acid to the reaction mixture provided a polymer having superior drag reducing properties.

The polymerization process utilizes oxygen to initially inhibit polymerization of the monomer and, yet, enables the polymerization to be carried out in the presence of oxygen, although in a concentration less than that when it is used as an inhibitor. The oxygen can be pure oxygen. Preferably, however, air is employed as the oxygen source. The oxygen desirably is introduced into the reaction mixture by bubbling it into the mixture until saturation is reached. At ambient temperatures, in a reaction mixture comprising a water solution of acrylamide wherein the concentration of the acrylamide is of the order of from about 1 to about 8 weight percent, oxygen saturation is reached at about 3 to about 10 ppm, usually about 4 to about 6 ppm by weight of oxygen. At this concentration, the oxygen acts as a polymerization inhibitor. After the concentration of the oxygen has been reduced to about 0.1 to about 0.2 ppm, as by sparging with an inert gas, vacuum degassing, or by introducing an oxygen scavenger such as sodium bisulfite, or a combination thereof, polymerization of the monomer proceeds.

In general, it is preferred to use tap water in the preparation of the polymer. The advantage in using tap water is that the pH of the water is in the range of 8-10 which favors the polymerization reaction.

The temperature at which the polymerization is conducted is somewhat variable. In the polymerization of acrylamide, for example, the temperature of the reaction mixture desirably should be in the range of from about 30° C. to about 80° C., preferably from about 40° C. to about 55° C. Boiling should be avoided. Polymerization times, likewise, are variable. Again, using acrylamide as the monomer, polymerization of the monomer is permitted to proceed for a period of from 8-12, usually about 9-10 hours. The polymerization reaction is exothermic, and the reaction mixture, after the initial reaction period, is stirred at the terminal exotherm temperature of the mixture for an added 1 to 4, generally 2 to 3, hours.

When polymerization is completed, an amount of a monovalent base such as sodium or potassium hydroxide is added to the polymer to hydrolyze from about 5 or 10 to about 50 mole percent of the amide groups in the case of a polymer such as polyacrylamide, or ester groups, in the case of a polymer such as polymethylmethacrylate. Where the polymer is polyacrylamide, the generally optimum objectives of the invention from the standpoint of drag reduction and flocculation, are attained with a partially hydrolyzed polyacrylamide in which from abou 25 to about 35 especially desirably about 30 mole percent, of the amide groups have been converted to carboxylate groups.

By way of specific illustration of the process of making a polymer for use in the treatment of a sewer system in accordance with the practice of this invention, a monomer such as acrylamide, which may be in the form of a solid, or a commercially available 50%, by weight, $Cu^{++}$ inhibited aqueous solution, is introduced into a reaction vessel along with water. If the monomer is in the form of an aqueous solution of the type mentioned, the solution advantageously is first passed through an ion exchange resin to remove $Cu^{++}$. The aqueous monomer solution in the reaction vessel will comprise about 6%, by weight, monomer and will have a pH in the range of from about 8 to about 10. The concentration of oxygen in the solution will be of the order of about 4 to 6 ppm. The monomer solution is heated to a temperature of about 40° C. to about 45° C. The heated solution is then sparged with nitrogen until the oxygen concentration is reduced to a level of about 0.1 to about 0.2 ppm. Sparging rates are somewhat variable. Generally speaking, they should range from about 0.1 to 10, preferably 1 to 2 volumes of gas per volume of solution. Assuming for purposes of this illustration that a cocatalyst comprising sodium bisulfite and ammonium persulfate is employed, sodium bisulfite is first introduced into the reaction vessel. The bisulfite acts as an oxygen scavenger, and augments the deoxygenation achieved with the nitrogen gas. Ammonium persulfate is then added to the reaction mixture. The concentration of the components of the cocatalyst will be about 180 ppm of the bisulfite and about 400 ppm of the persulfate, based upon the weight of the acrylamide monomer. The concentration, of course, can be varied, and as mentioned above, is an important factor in providing a polymer having an average molecular weight and molecular weight distribution capable of meeting the demands of a particular sewer system. More specifically in this connection, it has been found that the average molecular weight of a polymer is a linear function of the inverse square root of the concentration of the catalyst. Thus, by selecting the appropriate catalyst or cocatalyst concentration, it is possible to prepare a polymer having a desired average molecular weight and molecular weight distribution capable of enabling optimum drag reduction to be achieved in a particular sewer system. Following addition of the cocatalyst, the mixture in the reaction vessel is allowed to react for from 8 to 12 hours. The reaction exotherms until a temperature of from about 55° C. to about 60° C. is reached. The reaction mixture is stirred for approximately 2 to 3 hours while at this temperature. The 6% polymerized solution is thereafter mixed with a 50% solution of sodium hydroxide. The amount of the aqueous caustic employed is such that about 0.3 mole of the hydroxide is admixed with about 1 mole of the polyacrylamide, that is, sufficient caustic is introduced to hydrolyze approximately 30% of the amide groups comprising the polymer. The partially hydrolyzed polymer solution is then mixed with fresh water to form about a 1%, by weight, aqueous solution of the partially hydrolyzed polyacrylamide. The solution may be held for about 10 to about 12 hours to digest, and then diluted with water to provide an aqueous solution of partially hydrolyzed polyacrylamide ready to be introduced into a sewer system. In this connection, it has been found that the objectives of the present invention can be achieved with concentrations of the partially hydrolyzed polymer in the range of 1 to about 10,000, usually about 5 to about 500, ppm in the fluid waste materials normally present in sewer systems.

As stated, the process described above enables the preparation of polymers, especially polymers such as partially hydrolyzed polyacrylamide, having a selectively controllable average molecular weight and a molecular weight distribution such that a quantitative correlation can be made between those parameters and the drag reduction capabilities of the polymer in a sewer system. Polymers, especially man-made polymers, are complex mixtures of molecules of varying molecular weights. For this reason, the molecular weights of polymers are measured and reported as average molecular weights (M). In theory, a number of methods are available for determining the average molecular weight of a polymer. Included among these methods are light scattering, gel permeation chromatography, electronmicroscopy, and ultracentrifugation, to name a few. In accordance with the preferred practice of this invention, ultracentrifugation is employed to obtain the average molecular weight characteristics of polymers produced by the process described above. In addition to enabling the measurement of the average molecular weight of a polymer, ultracentrifugation provides information which enables the calculation of the molecular weight distribution of the polymer. This is a significant measurement in that it provides information on the weighted range of the diverse molecular weight species comprising the polymer. An accurate knowledge of the average molecular weight and molecular weight distribution of a polymer species allows one to correlate not only the performance of a polymer in a sewer system, but, also, polymer solution properties such as screen factor and Brookfield viscosity, with a fundamental and important polymer property, namely, molecular weight.

Basically, ultracentrifugation is a technique for measuring sedimentation rates. Analytical ultracentrifuges capable of providing such data are commercially available, excellent results being attainable with a Beckman Model E Analytical Ultracentrifuge. On the basis that a large mass (high molecular weight) sediments faster than a small mass (low molecular weight), as measured at the high angular velocities at which the ultracentrifuge operates, the average molecular weight $\overline{(M)}$ of a polymer can be calculated from the sedimentation data provided by the ultracentrifuge utilizing a combination of the Svedberg equation (1), and the Flory-Mendelkern-Schrage equation (2). The equations are shown below:

$$\overline{M} = \left[\frac{S_o}{D_o}\right]\left[\frac{Kt}{1 - \bar{v}\rho_o}\right] \quad (1)$$

where:
$S_o$ is the sedimentation coefficient at infinite dilution
$D_o$ is the diffusion coefficient at infinite dilution
K is the gas constant
t is temperature
$\bar{v}$ is the polymer partial specific volume
$\rho_o$ is the solvent density $$\overline{M} = \left[\frac{S_o[\mu]^{\frac{1}{3}}\mu_o N}{\beta(1 - \bar{v}\rho_o)}\right] \quad (2)$$

where:
$S_o$ is the sedimentation coefficient at infinite dilution
$[\mu]$ is the intrinsic viscosity
$\mu_o$ is the solvent viscosity in poise
$\rho_o$ is the solvent density
N is Avogadro's number
$\beta$ is a constant related to the polymer frictional coefficient
v is the polymer partial specific volume The quantities $S_o$ and $D_o$ in equation (1) are obtained by plotting the sedimentation and diffusion coefficient data obtained from the ultracentrifuge against the concentration of the polymer under investigation, and then extrapolating the essentially linear relationship of these parameters to infinite dilution to get $S_o$ and $D_o$. The parameter $\bar{v}$, that is, the polymer partial specific volume, cannot be evaluated experimentally by the usual pycnometric method because viscosity precludes preparation of sufficiently concentrated solutions. Therefore, the value of v is determined using a sophisticated densitometer (Mettler DMA 55) which allows the measurement of high viscosity solutions. The $\beta$ constant for numerous polymers other than partially hydrolyzed polyacrylamides are available. A suitable model was chosen from these to get a close approximation of this parameter. Single strand DNA provides an excellent model since it is of comparable molecular weight, is linear, and has pendant charged groups. The $\beta$ constant for DNA is $2.51 \times 10^6$, and this is the value used in making the calculations from the data obtained from the ultracentrifuge.

In addition to providing data for measuring the average molecular weight of a polymer species, ultracentrifugation provides information for the calculation of molecular weight distribution of a polymer species. As stated, this is a highly useful measurement in that it provides important knowledge with regard to the weighted range of the varied molecular weight characteristics of a polymer species. For any given polymer species, the optics of the ultracentrifuge generate a pattern, which is registered refractometrically, representing the concentration gradient of the polymer versus the distance from the center of rotation. The gradient curves thusly generated are transformed directly into a distribution of sedimentation coefficients which can be converted to a distribution in molecular weight. A quantitative measure of the molecular weight distribution is obtained by taking the moments of the distribution curves generated by the optics of the ultracentrifuge and determining the standard deviation of molecular weight of abundance for a particular molecular species present in a selected polymer sample. This value is represented by the symbol σ (sigma). Since the molecular weight distribution is dependent upon the average molecular weight of the polymer, the relative width or spread of the molecular weight distribution of the polymer is determined by dividing the value obtained for σ from the distribution curves by the average molecular weight (M) of the polymer.

The foregoing calculations can be made for a large number of polymer species prepared by the process described above to provide a meaningful correlation between the average molecular weight of a polymer and its drag reduction properties.

The generally optimum objectives of the present invention are met with partially hydrolyzed polyacrylamides having an average molecular weight (M) in the range of from about 2 to about 15 million, preferably from about 4 to about 7 million, and a molecular weight distribution, as obtained by the relationship σ/M, of from about 0.02 to about 0.22.

The polymers useful in the practice of this invention exhibit excellent viscoelastic properties at high concentrations in a fluid in which they are dissolved. Such polymers, therefore, have excellent drag reduction characteristics at low concentrations. Generally speaking, the higher the molecular weight of the polymer, the greater are the viscoelastic properties of the polymer. The polymers also are characterized in that they are linear, a factor which enhances their drag reducing capabilities.

The polymers may be introduced into a sewer system at any desired point. In systems relying upon gravity to move fluid waste materials, the polymer advantageously is added to the system at some high point in the system to attain maximum use of the polymer. In systems utilizing pumps as the primary means for moving fluid waste materials, the polymer may be introduced either upstream or downstream from a pump in the system. The polymers are non-corrosive and, therefore, have no adverse affects on equipment employed in a system even after prolonged use.

If desired, compatible additives may be incorporated into the polymer solution before it is introduced into a sewer system. Included among such additives are surfactants, corrosion inhibitors, biocides, sequestering agents, solvents, and the like.

The following example is illustrative of the method of the present invention.

EXAMPLE

Three partially hydrolyzed polyacrylamides, each having approximately 30% of the original amide groups hydrolyzed, and each having a different average molecular weight and molecular weight distribution, are added to separate samples of fluid waste materials obtained from a section of the sewer system of Denver, Colorado. The concentration of each the polymers in the samples is approximately 1 ppm. The samples are tested for drag reduction, and flocculating properties, in a ½ inch pipeline loop at room temperature. A Moyno pump is used to maintain flow in the loop. The pipeline loop has a 10 foot long section over which the pressure drop is measured, and a flow meter is connected to the loop to measure flow rate. The data obtained is as follows:

| Run | Polymer | p/L (psi/mi) | Velocity (ft/sec) | o/o Drag Reduction |
|---|---|---|---|---|
| 1. | Fluid waste material sample | 6615 | 15.5 | — |
| 2. | Fluid waste material sample with polymer having average molecular weight of 3,000,000 and molecular weight distribution of 0.18 | 3048 | 12.6 | 51.6 |
| 3. | Fluid waste material sample with polymer having average molecular weight of 7,500,000 and molecular weight distribution of 0.10 | 2125 | 12.5 | 67.3 |
| 4. | Fluid waste sample with polymer having average molecular weight of 11,000,000 and molecular weight distribution of 0.05 | 2312 | 12.6 | 64.5 |

The percent drag reduction is the measure of the effectiveness of the polymers in the fluid waste material samples, and is determined by dividing the difference between the pressure drop of the fluid waste material sample minus the pressure drop of the polymer containing samples and dividing this difference by the pressure drop of the fluid waste material sample. The tests indicate that a partially hydrolyzed polyacrylamide having an average molecular weight of the order of 7 to 8 million, and a molecular weight distribution of approximately 0.075 is best suited to attain optimum drag reduction in the system from which the fluid waste material sample is taken. The polymers, in each instance, are effective flocculating agents in that no waste material adhered to the walls of the loop, and solids in the material are maintained in a highly fluid state.

We claim:
1. A method of reducing the fluid flow friction loss of fluid waste materials in the conduits of sanitary sewer systems while at the same time maintaining the solid materials in the fluid in a flowable condition, comprising: providing an aqueous polymer solution obtained by (1) polymerizing a dilute aqueous solution containing about 1% to about 8%, by weight, of a water soluble monomer in the presence of a polymerization initiator, the monomer being characterized in that it contains at least one vinyl grouping wherein the vinyl group is an acrylyl vinyl, a vinyl cyanide, a styryl vinyl, or a water soluble salt thereof, the polymerization initiator being present in a concentration such that the resulting polymer will have an average molecular weight in the range of about 2 million to about 15 million, and a molecular weight distribution of the order of about 0.02 to about 0.22 as determined by the ratio σ/M wherein σ is the standard deviation of molecular weight of abundance of a molecular species present in the polymer and M is the average molecular weight of the polymer, to enable optimum reduction of the fluid flow friction loss to be achieved in the conduit of a sanitary sewer system; (2) adding a hydrolyzing agent to the dilute aqueous poly- mer solution in an amount sufficient to hydrolyze a portion only of the hydrolyzable functional groups comprising the polymer; and admixing about 1 to about 10,000 ppm of the resulting aqueous solution of the partially hydrolyzed polymer with the fluid waste materials in a conduit of a sewer system to provide optimum reduction of the fluid flow friction loss of the fluid waste materials in the conduit while at the same time maintaining the solids in the fluid waste materials in an easily flowable condition.

2. A method according to claim 1 wherein the polymer is a partially hydrolyzed polyacrylamide.

3. A method according to claim 2 wherein from about 5 to about 50 mole percent of the amide groups of the polyacrylamide are hydrolyzed.

4. A method according to claim 1 wherein the polymer is admixed with the fluid waste materials in the form of an aqueous solution comprising from about 5 to about 500 ppm of the polymer.

5. A method of reducing the fluid flow friction loss of fluid waste materials in the conduits of sanitary sewer systems while at the same time maintaining the solid materials in the fluid in a flowable condition, comprising: providing an aqueous polymer solution obtained by (1) polymerizing a dilute aqueous solution of a water soluble monomer in the presence of a polymerization catalyst, the monomer being characterized in that it contains at least one vinyl grouping wherein the vinyl group is an acrylyl vinyl, a vinyl cyanide, a styryl vinyl or a water soluble salt thereof, the concentration of the monomer in the solution being from about 1% to about 8%, by weight, the proportion of catalyst present being regulated during polymerization to provide a polymer having an average molecular weight in the range of about 2 million to about 15 million, and a molecular weight distribution of the order of about 0.02 to about 0.22 as determined by the ratio $\sigma/\overline{M}$ wherein $\sigma$ is the standard deviation of molecular weight of abundance of a molecular species present in the polymer and $\overline{M}$ is the average molecular weight of the polymer, to provide optimum reduction of fluid flow friction loss in the conduits of said sewer system; (2) contacting the resulting polymer with a hydrolyzing agent in the form of a monovalent base in an amount to effect partial hydrolyzation of the hydrolyzable functional groups comprising the polymer while maintaining the average molecular and molecular weight distribution of the polymer; and admixing about 1 to about 10,000 ppm of the resulting aqueous solution of the partially hydrolyzed polymer with the fluid waste materials in a conduit of a sewer system, to provide optimum reduction in fluid flow friction loss while at the same time functioning as a flocculating agent for the solids in the fluid waste materials.

6. A method according to claim 5 wherein the polymer is a partially hydrolyzed polyacrylamide.

7. A method according to claim 6 wherein about 30 mole percent of the amide groups of the polyacrylamide are hydrolyzed.

8. A method according to claim 5 wherein the polymer is present in an amount of from about 5 to 500 ppm in the fluid waste materials in the conduit.

9. A method according to claim 5 wherein the monomer is a member of the group consisting of acrylamide, acrylic acid, acrylonitrile, methacrylic acid, methacrylamide, methacrylonitrile, methyl methacrylate and alkali metal styrene sulfonates.

* * * * *

UNITED STATES PATENT AND TRADEMARK OFFICE
CERTIFICATE OF CORRECTION

PATENT NO. : 4,397,748
DATED : August 9, 1983
INVENTOR(S) : Perry A. Argabright et al It is certified that error appears in the above-identified patent and that said Letters Patent are hereby corrected as shown below:

| | |
|---|---|
| Col. 4, line 14: | Delete "abou" and insert --about--. |
| Col. 5, line 31: | Delete "M" and insert --$\bar{M}$--. |
| Col. 5, line 34: | Delete "electronmicroscopy" and insert --electron microscopy--. |
| Col. 5, line 56: | Delete "untracentrifuges" and insert --ultracentrafuges--. |
| Col. 6, line 27: | Delete "v" and insert --$\bar{v}$--. |
| Col. 7, line 10 | Delete "(M)" and insert --($\bar{M}$)--. |
| Col. 7, line 18: | Delete "(M)" and insert --($\bar{M}$)--. |
| Col. 7, line 42: | Delete "affects" and insert --effects--. |
| Col. 7, line 60: | After each, insert --of--. |
| Col. 7, line 67: | Delete "is" and insert --are--. |
| Col. 8, line 4: | Delete "6615" and insert --6515--. |
| Col. 8, line 62: | Delete "$\sigma$/M" and insert --$\sigma$/$\bar{M}$--. |
| Col. 8, line 64: | Delete "M" and insert --$\bar{M}$--. |
| Col. 10, line 13: | After lar, insert --weight--. |

Signed and Sealed this

Eighteenth Day of October 1983

[SEAL]

Attest:

GERALD J. MOSSINGHOFF

Attesting Officer        Commissioner of Patents and Trademarks